United States Patent [19]

Flournoy

[11] 4,412,315

[45] Oct. 25, 1983

[54] ACOUSTIC PULSE-ECHO WALL THICKNESS METHOD AND APPARATUS

[75] Inventor: Norman E. Flournoy, Houston, Tex.

[73] Assignee: Texaco Inc., White Plains, N.Y.

[21] Appl. No.: 286,921

[22] Filed: Jul. 27, 1981

[51] Int. Cl.³ .............................................. G01S 15/08
[52] U.S. Cl. ...................................... 367/99; 73/623; 310/335; 367/151
[58] Field of Search ................. 367/140, 141, 151, 99, 367/87; 73/622, 623, 627; 310/335

[56] References Cited

U.S. PATENT DOCUMENTS 3,106,839  10/1963  Sansom ............................ 310/335 X
4,022,055  5/1977  Flournoy et al. ................ 367/141 X Primary Examiner—Richard A. Farley
Attorney, Agent, or Firm—Carl G. Ries; Robert A. Kulason; Henry C. Dearborn

[57] ABSTRACT

An apparatus and method for making wall thickness measurements. It is particularly applicable to pipeline use. It uses a pulse-echo acoustic arrangement with a single piezoelectric transducer sending and receiving acoustic signals from both faces. It has a pair of reflectors, one for each face of the transducer so that acoustic energy is directed both normal to the wall and at an angle in order to simultaneously measure the wall thickness and find any anomaly such as pitting or the like. For pipeline use there may be a plurality of instruments situated around the periphery of a unit to scan the walls as it travels through the pipeline.

6 Claims, 7 Drawing Figures

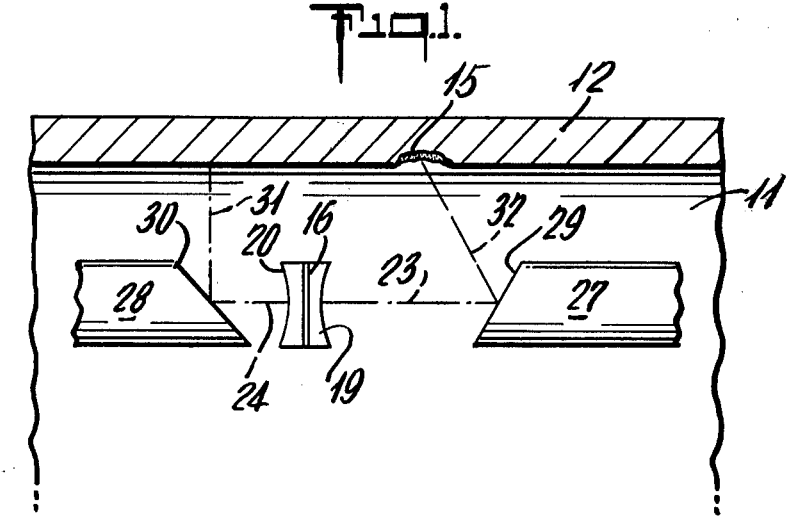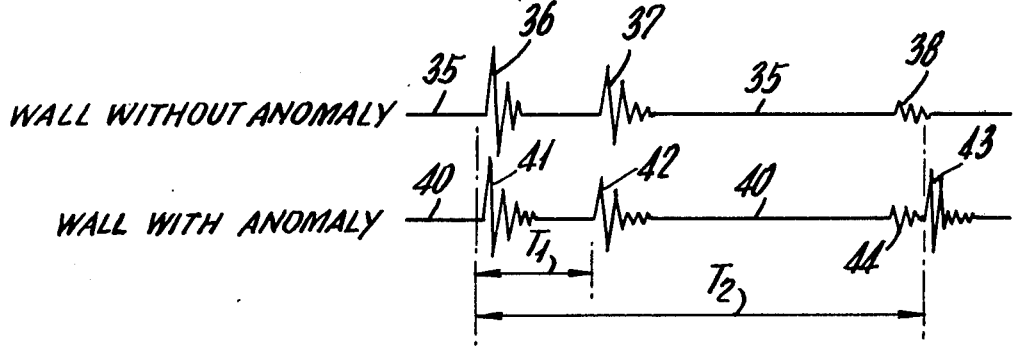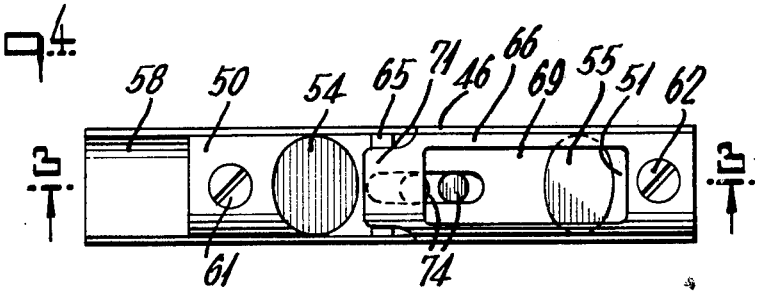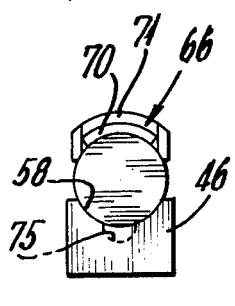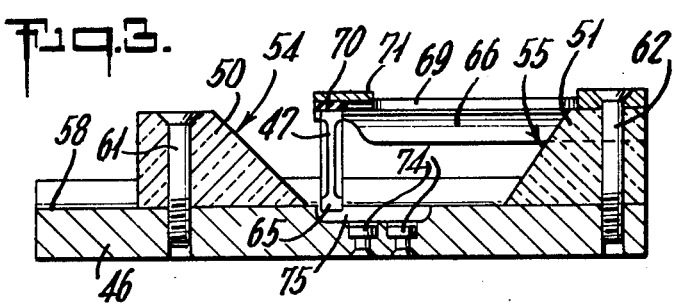

ACOUSTIC PULSE-ECHO WALL THICKNESS METHOD AND APPARATUS

BACKGROUND OF THE INVENTION

1. Field of the Invention

This invention relates to wall thickness measuring apparatus and/or method, in general. More specifically, it concerns a pulse-echo acoustic system for measuring wall thickness and simultaneously determining presence of anomalies in the wall being surveyed.

2. Description of the Prior Art

Heretofore, acoustic pulse-echo type measurements have been employed for wall thickness non-destructive measurements and there are two U.S. Pat. Nos. 3,995,179 issued Nov. 30, 1976, and 4,022,055 issued May 10, 1977, both of which are assigned to the same assignee as this application. These patents describe piezoelectric transducer structure which was employed in making the type of wall thickness measurements that are of concern in this application. However, the earlier patent dealt with the need for dissipating or damping the acoustic energies from one side of a piezoelectric crystal in order to avoid the interfering signals generated at the back face of the crystal. And, the later of those two patents showed and described a structure for splitting the energy that was transmitted from a transducer in order to have one portion directed normally to the wall to be measured while the other portion is directed at an acute angle for discovering anomalies that may exist in the wall of a pipe or the like being measured.

Although there exists a U.S. patent to Sansom, U.S. Pat. No. 3,106,839 issued Oct. 15, 1963, it discloses a wheel with a rubber tire exterior which was designed to ride upon the surface of a rail such as a railroad rail or the like. And, energies from a transducer are reflected down to the same location at the base of the wheel. Therefore, it is not applicable to the type of wall thickness measurement and simultaneous surveying that the applicant's invention is concerned with.

SUMMARY OF THE INVENTION

Briefly, the invention concerns an acoustic pulse-echo wall thickness testing method which comprises the steps of generating acoustic pulses in opposite directions simultaneously and reflecting one of said pulses into a path normal to said wall. It also comprises reflecting the other of said pulses into a path oblique to said wall, and receiving returning pulses along both said paths to determine thickness and presence of an anomaly in said wall.

Again briefly, the invention concerns apparatus for measuring wall thickness using an ultrasonic pulse-echo procedure. It comprises a piezoelectric transducer having parallel faces situated transversely to said wall, and a first polished metal reflector situated at 45° relative to said wall and spaced from one of said transducer faces for reflecting a pulse normal to said wall. It also comprises a second polished metal reflector situated at an oblique angle more than 45° relative to said wall and spaced from the other of said transducer faces for reflecting a pulse at an oblique angle to said wall. It also comprises means for receiving returning pulses at said transducer faces.

BRIEF DESCRIPTION OF THE DRAWINGS

The foregoing and other objects and benefits of the invention will be more fully set forth below in connection with the best mode contemplated by the inventor of carrying out the invention and in connection with which there are illustrations provided in the drawings, wherein:

FIG. 1 is a schematic illustration indicating the elements of wall thickness measuring apparatus according to the invention;

FIG. 2 illustrates seismic signals that are developed as the apparatus indicated in FIG. 1 is employed;

FIGS. 3, 4 and 5 illustrate three views of a unitary instrument constructed according to the invention, FIG. 3 being a longitudinal cross-section taken along the lines 3—3 of FIG. 4;

FIG. 4 is a plan view of the instrument illustrated in FIGS. 3–5;

FIG. 5 is an end elevation of the instrument illustrated in FIGS. 3–5;

DESCRIPTION OF THE PREFERRED EMBODIMENTS

Figure 6:
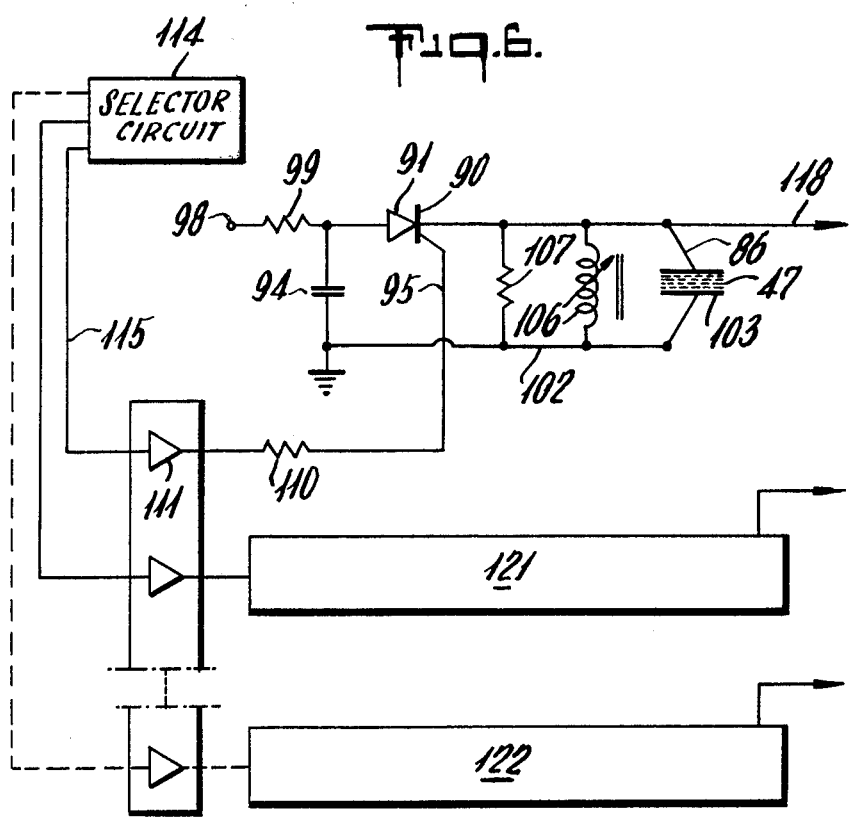
FIG. 6 is a circuit diagram illustrating the arrangement of circuits that are employed where a plurality of instruments such as the instrument illustrated in FIG. 3–5 are employed.

FIG. 1 is a schematic illustration indicating elements that are involved in the procedure for a method of acoustic pulse-echo wall thickness testing according to this invention. There is indicated a fragmentary portion in cross-section of a pipe 11 that has a wall 12 shown in cross-section. The wall 12 may have an anomaly such as a pitted spot 15 therein. There is a transducer 16 that is preferably a piezoelectric crystal. It has two faces, each of which are coated with a lens made of an epoxy material for acoustic matching to the fluid (not shown) within the pipe 11. Thus, there are lenses 19 and 20 illustrated. One is located on each face of the transducer 16, and when the transducer is actuated to produce acoustic energy by means of applying an electrical pulse, there is simultaneously generated an acoustic pulse which is transmitted from each face of the transducer 16. This is indicated by a pair of dashed lines 23 and 24.

The acoustic pulses travel along the paths indicated by the dashed lines 23 and 24 having been transmitted through the lenses 19 and 20, respectively. And, there are a pair of metal reflector elements 27 and 28 which reflect the pulses traveling on paths 23 and 24, respectively, from angled faces 29 and 30, respectively, of each. It will be observed that the faces are oriented so that the face 30 of reflector 28 is at 45° relative to the wall 12 of the pipe 11, while the face 29 of the reflector 27 is at an angle greater than 45° relative to the wall 12. Consequently, the pulse on path 24 is reflected so as to travel on a path 31 that is normal to the wall 12, while the pulse on path 23 is reflected onto a path, which path is oblique to the wall 12.

The pulse-echo technique is well known. It employs ultrasonic energies so that short time duration signals may be employed which lend themselves to such measurements as are of concern here. It will be understood that the system involves a short time duration, unitary pulse of ultrasonic acoustic energy that is created by applying a short time duration electrical voltage to the crystal of transducer 16, in a conventional manner. For example, see the disclosure of the U.S. Pat. No. 3,995,179 mentioned above. The crystal material is preferably lead metaniobate, and in the schematic illustration it would be a flat disc shape having silvered faces (not shown) which act as the electrodes for causing the deformation of the crystal upon application of the electrical energy pulse.

FIG. 2 illustrates oscillograph traces which would be developed as the system is employed in accordance with the method. An upper trace 35 has returning pulses 36 and 37 thereon. These indicate the thickness of the wall 12 as shown by the time $T_1$ indicated at the bottom of the oscillograph illustration. Pulse 36 is the first returned (reflected) energy from the inside of the wall 12, and pulse 37 is that reflected from the outside of the wall 12. The acoustic pulse creating these reflections traveled over the paths 24 and 31 which were described above.

As indicated by the caption, the oscillograph trace 35 shows the signals that are received when the relative positions of the elements and the spot 15 on the pipe wall are such that there is no anomaly in the path of the other acoustic pulse traveling over the paths 23 and 32 and being reflected by the reflector element 27. Thus, there is only a low amplitude signal 38 reflected by the surface roughness of the inside of the wall 12.

However, when an anomaly such as the spot 15 is present in the path 32, the oscillograph trace is like lower trace 40 in FIG. 2. It contains pulses 41 and 42 that are returned along the path 31 which is normal to the wall 12. And also, after a longer interval of time $T_2$, there is an additional pulse 43 which is caused by the reflected energy from the depth of the spot 15 returning along the paths 32 and 23 and going back to the face of the transducer 16. There also may have been a preceding surface roughness signal 44.

It may be noted that in contrast with the operation of a system according to the above noted U.S. Pat. No. 4,022,055, the signal strength obtained is greatly increased by using the arrangement according to this invention. Thus, whereas in that patent the two pulse beams were acquired by having a split reflector in order to obtain two different angles of incidence, the present invention provides full signal strength going in the two opposite directions while obtaining the same angles of incidence to the pipe wall and, of course, with greatly increased signal strength. For example, the following tables compare the output voltages in millivolts obtained by the dual reflector transducer according to this invention, to the output voltages of a split reflector transducer as described in the above noted U.S. Pat. No. 4,022,055.

TABLE I

| Signal Output, mv | | | |
|---|---|---|---|
| Inside Wall Reflection | Outside Wall Reflection | Transducer Type | Pipe Size |
| 260 | 80 | D | 6 inch |
| 135 | 55 | S | |
| 320 | 50 | D | 8 inch |
| 210 | 40 | S | |
| 270 | 75 | D | |

TABLE I-continued

| Signal Output, mv | | | |
|---|---|---|---|
| Inside Wall Reflection | Outside Wall Reflection | Transducer Type | Pipe Size |
| 120 | 30 | S | 10 inch |

D = Dual Reflector
S = Split Reflector

With reference to FIGS. 3, 4 and 5, there is illustrated a unit according to this invention which incorporates the basic elements that are illustrated in the schematic showing of FIG. 1. There is a somewhat elongated body 46 that has mounted centrally thereof a piezoelectric transducer disc 47. Spaced longitudinally one on either side from the transducer disc 47, there are a pair of polished metal reflector elements 50 and 51. These are cylindrical in shape with polished reflecting faces 54 and 55, respectively, situated at angles of 45° and something more than 45° relative to the longitudinal axis of the body 46. These angles are used in order to obtain reflection paths like those indicated in FIG. 1. The reflectors 50 and 51 rest in a hollowed upper surface 58 located along the top of the body 46. There are bolts 61 and 62 which go through holes in the reflector cylinders 50 and 51 to hold them securely in place.

The transducer crystal 47 is mounted in any feasible manner such as by being supported in a rim 65 that is suspended from an upper cantilevered roof element 66. Roof 66 has an elongated window or opening 69 for permitting free passage of the acoustic pulse energies from the transducer 47 to and from the reflector face 55. There is a resilient material pad 70 between the rim 65 (at the top of the transducer 47) and an upper plate 71 formed by an extension of the roof 66. The cantilevered roof 66 is held in place by being secured under the head of the bolt 62 as the roof lies over the top of the reflector 51. There are access holes 74 for accommodating electrical terminal connectors (not shown) which have the circuit connections (not shown) brought out via a short groove 75 to keep such connecting wires out of the path of acoustic energies. It will be understood that the structure of the electrodes for transducer 47 is well known and is as described in the above U.S. Pat. Nos. 3,995,179 and 4,022,055. Thus, the electrodes include silvered faces (not shown) on the transducer 47.

Figure 7:
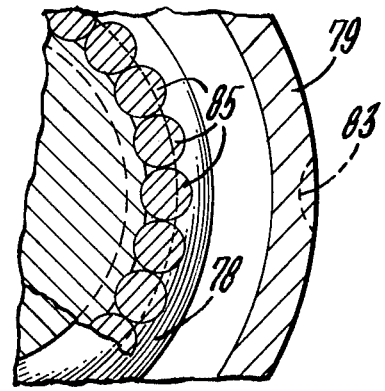
FIG. 7 is a fragmentary cross-sectional schematic indicating the use of a plurality of instruments such as that illustrated in FIGS. 3–5 around the periphery of a surveying instrument which may traverse the inside of a pipe.

With reference to FIGS. 6 and 7, it should be noted that the apparatus according to this invention is particularly well adapted for use in surveying the wall structure of a pipeline. And, in such case there will be employed a plurality of units like that shown and described above in connection with FIGS. 3, 4 and 5. Thus, in FIG. 7 there is shown a plurality of instruments 85 which are indicated schematically in cross-section. They are mounted on a concentric structure 78 within a pipe 79. The plurality of instruments 85 are mounted longitudinally with the transducers of each oriented so that the faces thereof are transverse to the pipe wall 79. It will be noted that the instruments 85 are situated around the periphery of the concentric structure 78 on which they are mounted so that the inside surface of the pipe 79 may be scanned and any anomalies such as a dashed line anomaly 83 (shown in FIG. 7) will be detected as some of the instruments are actuated in the scanning sequence.

Each of the instruments 85 has included therewith an electrical circuit arrangement like that illustrated in FIG. 6. Thus, each has a pulse generating circuit which includes a circuit connection 86 that leads from an electrode 87 of the transducer crystal 47. There is a common circuit connection 118 that is connected to a controlled electrode 90 of a silicon controlled rectifier 91. The SCR 91 acts to pass a voltage pulse from a charged capacitor 94 to the transducer crystal 47 whenever it is triggered by a signal applied to a circuit 95 so as to trip the SCR 91 into conduction. The capacitor 94 is maintained charged by a relatively high DC potential which is maintained at a terminal 98 with a resistor 99 between the terminal 98 and the high potential plate of capacitor 94.

It will be understood that throughout this specification whenever the abreviation SCR is employed it stands for silicon controlled rectifier. Such abreviation is well known to one skilled in the electronic arts.

Referring to the pulse generating circuit of FIG. 6 again, it will be noted that there is a common ground circuit 102 that is connected to another electrode 103 of the transducer crystal 47. Also, the circuit 102 has one side of a variable inductor 106 as well as one end of a resistor 107 connected thereto. In addition, there is a resistor 110 that is in the control circuit 95. The control circuit goes via the resistor 110 from the output of an amplifier 111. And, the output of a selector circuit 114 goes to the input of the amplifier 111 over a circuit connection 115.

It will be understood that after each pair of acoustic pulses is transmitted by application of the voltage pulse from capacitor 94 to the transducer crystal 47, a sufficient period of time is allowed before the next electrical pulse is applied so as to permit the reflected acoustic pulses traveling over both paths, e.g. path 24 and 31, (FIG. 1) in addition to path 23 and 32, may reach the crystal 47 of the transducer. And, it will be understood that when these reflected pulses of acoustic energy reach the crystal 47 there will be electrical signals generated and carried over a circuit connection 118. Circuit connection 118 goes to an amplifier (not shown) from which it may go to an oscilloscope (not shown) to develop oscillograph signals like those illustrated in FIG. 2.

It will be appreciated that there is an individual control and reflected-pulse amplifier circuit for each of the transducers of the instruments 85. This is indicated in FIG. 6 where there are rectangles 121 and 122 which represent additional circuits like that described above in connection with the crystal 47. There will, of course, be one such circuit for each of the instruments 85 indicated in FIG. 7.

It will also be understood that the time elements involved in sending and receiving individual acoustic pulses and reflected return pulses are relatively short so that the complete scan of the instruments 85 may be carried out around the concentric structure 78 rapidly enough to provide adequate indication and measurement of the pipe wall conditions along a pipeline.

While particular embodiments of the invention have been described above in considerable detail in accordance with the applicable statutes, this is not to be taken as in any way limiting the invention but merely as being descriptive thereof.

I claim:

1. Acoustic pulse-echo wall thickness testing method, comprising the steps of
    generating acoustic pulses in opposite directions simultaneously,
    reflecting one of said pulses into a path normal to said wall,
    reflecting the other of said pulses into a path oblique to said wall, and
    receiving returning pulses along both said paths to determine thickness and presence of an anomaly in said wall.

2. Apparatus for measuring wall thickness using an acoustic pulse-echo procedure, comprising in combination
    means for generating simultaneous pulses in opposite directions,
    means for reflecting one of said pulses into path normal to said wall,
    means for reflecting the other of said pulses into a path oblique to said wall, and
    means for receiving returning pulses at said generating means.

3. Apparatus according to claim 2, wherein
    said means for generating simultaneous pulses comprises a piezoelectric transducer having parallel faces.

4. Apparatus according to claim 3, wherein
    said means for reflecting each of said one and said other pulse comprises a polished metal reflector.

5. Apparatus for measuring wall thickness using an ultrasonic pulse-echo procedure, comprising
    a piezoelectric transducer having parallel faces situated transversely to said wall,
    a first polished metal reflector situated at forty-five degrees relative to said wall and spaced from one of said transducer faces for reflecting a pulse normal to said wall,
    a second polished metal reflector situated at an oblique angle more than forty-five degrees relative to said wall and spaced from the other of said transducer faces for reflecting a pulse at an oblique angle to said wall, and
    means for receiving returning pulses at said transducer faces.

6. Apparatus according to claim 5, wherein
    said wall is a pipe and said apparatus also comprises a plurality of said transducers, reflectors and means for receiving returning pulses, and
    means for scanning said returning pulse means to cover the periphery of said pipe wall.

* * * * *